United States Patent
Sudarsanam et al.

(10) Patent No.: US 9,665,580 B1
(45) Date of Patent: May 30, 2017

(54) SYNCHRONIZATION OF DATA (71) Applicant: Tintri Inc., Mountain View, CA (US)

(72) Inventors: Raj A. Sudarsanam, Fremont, CA (US); Pratap V. Singh, Mountain View, CA (US); Edward K. Lee, Walnut Creek, CA (US); Mark G. Gritter, Eagan, MN (US)

(73) Assignee: Tintri Inc., Mountain View, CA (US)

( * ) Notice: Subject to any disclaimer, the term of this patent is extended or adjusted under 35 U.S.C. 154(b) by 275 days.

(21) Appl. No.: 13/938,011

(22) Filed: Jul. 9, 2013

Related U.S. Application Data (60) Provisional application No. 61/672,165, filed on Jul. 16, 2012.

(51) Int. Cl.
  G06F 7/00 (2006.01)
  G06F 17/00 (2006.01)
  G06F 17/30 (2006.01)

(52) U.S. Cl.
  CPC .............. G06F 17/30088 (2013.01)

(58) Field of Classification Search
  CPC . G06F 7/00; G06F 17/00; G06F 17/30; G06F 17/30088
  See application file for complete search history.

(56) References Cited

U.S. PATENT DOCUMENTS

| | | | |
|---|---|---|---|
| 6,526,574 B1 | 2/2003 | Jones | |
| 6,594,744 B1 | 7/2003 | Humlicek et al. | |
| 7,809,759 B1 | 10/2010 | Bruso et al. | |
| 8,463,825 B1 | 6/2013 | Harty et al. | |
| 8,612,488 B1 | 12/2013 | Subramanya et al. | |
| 2002/0161781 A1 | 10/2002 | Leong et al. | |
| 2003/0120863 A1 | 6/2003 | Lee et al. | |
| 2003/0182292 A1 | 9/2003 | Leong et al. | |
| 2004/0030727 A1 | 2/2004 | Armangau et al. | |
| 2004/0267836 A1 | 12/2004 | Armangau et al. | |
| 2005/0188049 A1 | 8/2005 | Perret et al. | |
| 2006/0112151 A1 | 5/2006 | Manley et al. | |
| 2006/0235892 A1 | 10/2006 | Kalach et al. | |
| 2007/0043574 A1 | 2/2007 | Coffman et al. | |
| 2007/0055833 A1 | 3/2007 | Vu et al. | |
| 2007/0106706 A1 | 5/2007 | Ahrens et al. | |
| 2007/0208918 A1* | 9/2007 | Harbin et al. | 711/162 |
| 2007/0260830 A1 | 11/2007 | Faibish et al. | |
| 2007/0271365 A1 | 11/2007 | Revanuru et al. | |
| 2007/0283111 A1 | 12/2007 | Berkowitz et al. | |

(Continued)

OTHER PUBLICATIONS

Author Unknown, "NetApp SnapRestore software uses stored Snapshot copies to recover entire file systems or data volumes in seconds.", http://www.netapp.com/us/products/protection-software/snaprestore.aspx.

(Continued)

*Primary Examiner* — Azam Cheema
(74) *Attorney, Agent, or Firm* — Van Pelt, Yi & James LLP (57) ABSTRACT

Synchronizing data is disclosed, including: generating a snapshot index associated with a first set of data; generating a set of difference data between a snapshot index associated with a second set of data and the snapshot index associated with the first set of data; and applying the set of difference data to a set of metadata associated with the first set of data, wherein the set of metadata reflects a current state of the first set of data.

20 Claims, 8 Drawing Sheets

(56) References Cited

U.S. PATENT DOCUMENTS

| | | | |
|---|---|---|---|
| 2008/0082593 A1 | 4/2008 | Komarov et al. | |
| 2008/0155223 A1 | 6/2008 | Hiltgen et al. | |
| 2008/0244028 A1 | 10/2008 | Le et al. | |
| 2009/0260007 A1 | 10/2009 | Beaty et al. | |
| 2009/0276774 A1 | 11/2009 | Kinoshita | |
| 2009/0307450 A1 | 12/2009 | Lee | |
| 2010/0070726 A1 | 3/2010 | Ngo et al. | |
| 2010/0122248 A1 | 5/2010 | Robinson et al. | |
| 2010/0257403 A1* | 10/2010 | Virk .................. | G06F 11/1453 714/15 |
| 2010/0262617 A1 | 10/2010 | Shinjo et al. | |
| 2011/0035359 A1 | 2/2011 | Bendakovsky et al. | |
| 2011/0153697 A1 | 6/2011 | Nickolov et al. | |
| 2011/0320404 A1 | 12/2011 | Akulavenkatavara et al. | |
| 2012/0005672 A1 | 1/2012 | Cervantes et al. | |
| 2012/0011106 A1 | 1/2012 | Reid et al. | |
| 2012/0323853 A1 | 12/2012 | Fries et al. | |
| 2012/0330964 A1 | 12/2012 | Baude et al. | |
| 2013/0262801 A1 | 10/2013 | Sancheti et al. | |
| 2014/0052761 A1 | 2/2014 | Teitelbaum | |

OTHER PUBLICATIONS

Author Unknown, "rysnc—Wikipedia", accessed Jul. 23, 2013 version on Nov. 5, 2014 via the Internet Wayback Machine, https://web.archive.org/web/20120619201533/http://en.wikipedia.org/wiki/Rsync.

Martin Pool, "rdiff(1)—Linkux man page", accessed Jun. 29, 2012 version on Nov. 5, 2014 via the Internet Wayback Machine, https://web.archive.org/web/20120629053647/http://linux.die.net/man/1/rdiff.

Ben Escoto "rdiff-backup(1)—Linux man page", accessed Jul. 5, 2012 version on Nov. 5, 2014 via the Internet Wayback Machine, https://web.archive.org/web/20120705001700/http://linux.die.net/man/1/rdiff-backup.

U.S. Appl. No. 13/938,005, "Efficient and Flexible Organization and Management of File Metadata", filed Jul. 7, 2013.

U.S. Appl. No. 14/202,836, "Efficient Data Synchronization for Storage Containers", filed Mar. 10, 2014.

U.S. Appl. No. 14/472,834, "Replication of Snapshots and Clones", filed Aug. 29, 2014.

Laverick et al., "Administering VMware View™ 4.5", Jan. 1, 2010, Retrieved from the Internet: URL: http://cdn.ttgtmedia.com/rms/pdf/view4.5-rtfm-guide-GAAE-1.pdf [retrieved on Aug. 5, 2016].

Ohad Rodeh, "B-trees, shadowing, and clones", ACM Transactions on Storage, vol. 3, No. 4, pp. 1-27, Feb. 1, 2008.

"Data Synchronization", Aug. 8, 2016, Wikipedia, en.wikipedia.org/wiki/Data_synchronization.

"Data Synchronization", Aug. 8, 2016, Techopedia, www.techopedia.com/definition/1006/data-synchronization.

* cited by examiner

SYNCHRONIZATION OF DATA

CROSS REFERENCE TO OTHER APPLICATIONS

This application claims priority to U.S. Provisional Patent Application No. 61/672,165 entitled EFFICIENT AND FLEXIBLE ORGANIZATION AND MANAGEMENT OF FILE METADATA filed Jul. 16, 2012 which is incorporated herein by reference for all purposes.

BACKGROUND OF THE INVENTION

In some instances, the state of a system is desired to be synchronized with a past state of the same system or with the state of another system. For example, data associated with a system may become corrupted and so it would be desirable to roll back the state of the data to a prior state that was not corrupted or to an uncorrupted state associated with another system. In another example, the data of a first system may be configured by a system administrator and instead of configuring the data of a second system, the second system can be simply synchronized to a state of the first system associated with the configured data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of synchronizing data are described herein. A request to synchronize a first set of data to a snapshot associated with the second set of data is received. For example, the first set of data and/or the second set of data may comprise a virtual machine (also sometimes referred to as a VM), a virtual disk (also sometimes referred as a vdisk), or a file. A snapshot associated with the first set of data is generated. A set of difference data (also sometimes referred to as a delta) between the snapshot associated with the second set of data and the snapshot associated with the first set of data is generated. The set of difference data is applied to a set of metadata associated with the first set of data. The set of metadata reflects a current state of the first set of data. After the set of difference data is applied to the set of metadata associated with the first set of data, the set of metadata (the current state of the first set of data) reflects the state of data associated with the snapshot of the second set of data.

In some embodiments, it is desirable to be able to "synchronize" the current state of a first set of data (e.g., associated with a VM) to that of another second set of data (e.g., associated with another VM) or a snapshot of the same first set of data. Synchronization replaces the current state of the first set of data with a copy of the specified state while preserving the "identity" and any existing snapshots associated with the first set of data. Uses for synchronization may include, for example: restoring the state of a set of data to a past state to recover from data corruption or for debugging purposes, propagating copies of a production data set to development, test, or preproduction VMs, and quickly rolling out new versions of software after testing in a preproduction environment.

In various embodiments, the metadata comprises one or more indices. For example, a snapshot comprises an index. A "user" performs read and write operations using "logical offsets," which are mapped to "physical offsets" using such an index. The physical offsets can then be used to read and write data from the underlying physical storage devices. Read operations lookup the logical offset in an index to find the corresponding physical offset, while write operations create new entries or update existing entries in an index.

Figure 1:
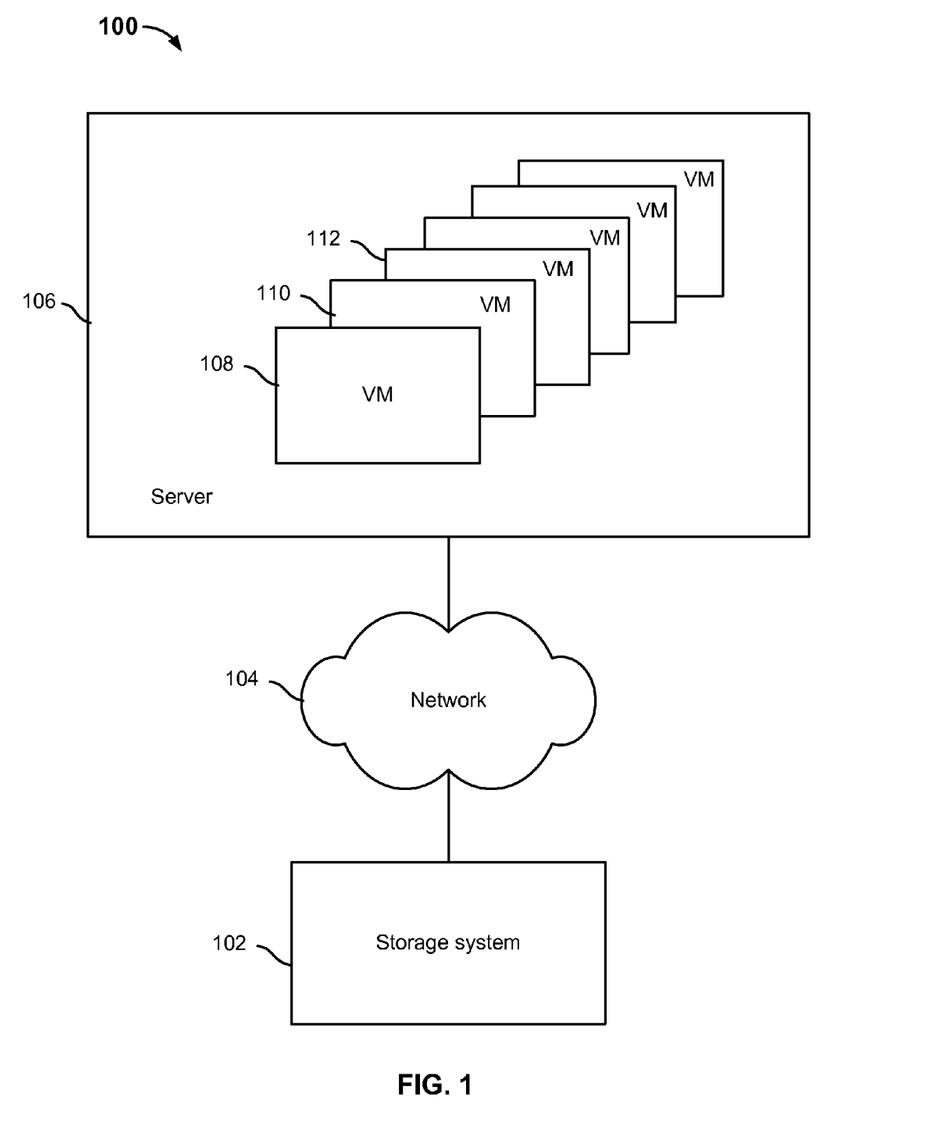
FIG. 1 is a diagram showing an embodiment of a storage system for the storage of VMs using virtual machine storage abstractions.

FIG. 1 is a diagram showing an embodiment of a storage system for the storage of VMs using virtual machine storage abstractions. In the example shown, system 100 includes server 106, network 104, and storage system 102. In various embodiments, network 104 includes various high-speed data networks and/or telecommunications networks. In some embodiments, storage system 102 communicates with server 106 via network 104. In some embodiments, the file system for the storage of VMs using virtual machine storage abstractions does not include network 104, and storage system 102 is a component of server 106. In some embodiments, server 106 is configured to communicate with more storage systems other than storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of virtual machine storage abstractions. In some embodiments, the respective files associated with (at least) VMs 108, 110, and 112 running on server 106 are stored on storage system 102.

In various embodiments, storage system 102 is configured to store meta-information identifying which stored data objects, such as files or other virtual machine storage abstractions, are associated with which VM or vdisk. In various embodiments, storage system 102 stores the data of VMs running on server 106 and also stores the metadata that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 102 refers to one or more physical systems and/or associated hardware and/or software components configured to work together to store and manage stored data, such as files or other stored data objects. In some embodiments, a hardware component that is used to (at least in part) implement the storage system may be comprised of either disk or flash, or a combination of disk and flash.

Figure 2:
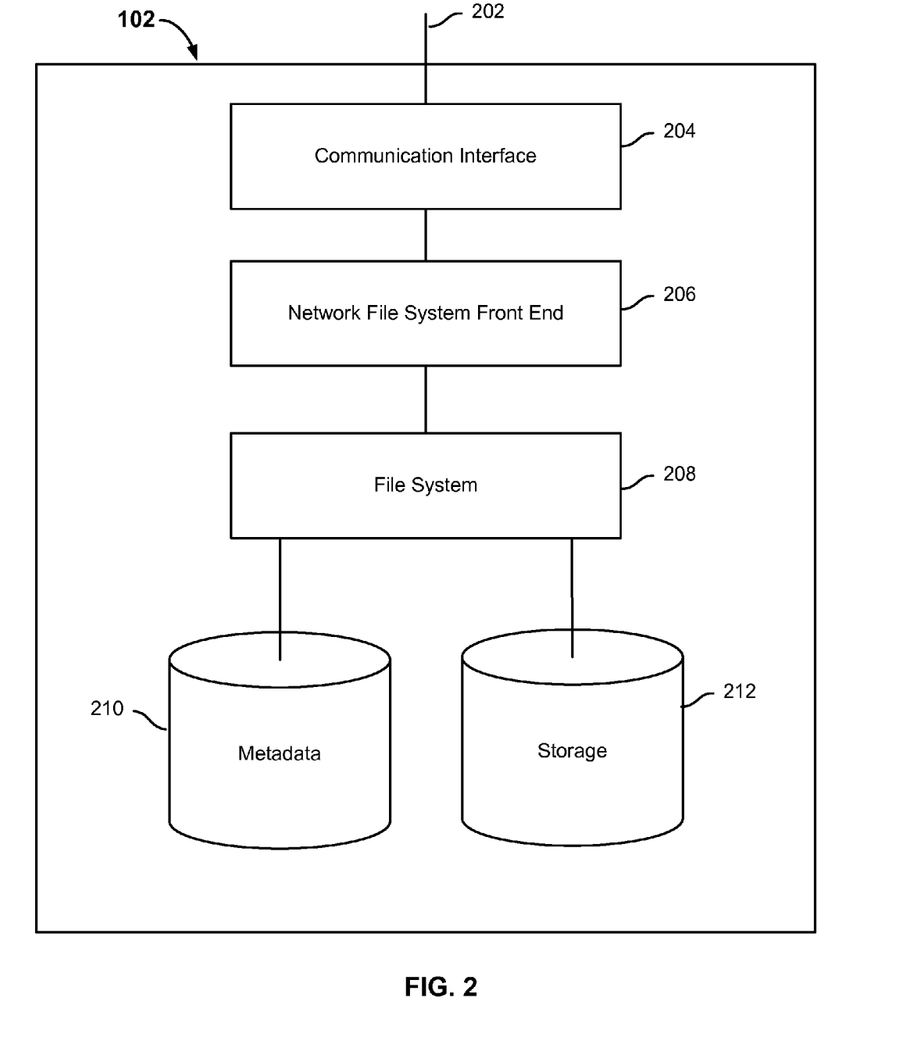
FIG. 2 is a block diagram illustrating an embodiment of a storage system configured to store virtual machine data.

FIG. 2 is a block diagram illustrating an embodiment of a storage system including data and metadata. In the example shown, storage system 102 includes a network connection 202 and a communication interface 204, such as a network interface card or other interface, which enable the storage system to be connected to and communicate via a network such as network 104 of FIG. 1. The storage system 102 further includes a network file system front end 206 configured to handle NFS requests from virtual machines running on systems such as server 106 of FIG. 1. In various embodiments, the network file system front end is configured to associate NFS requests as received and processed with a corresponding virtual machine and/or vdisk with which the request is associated, for example, using meta-information stored on storage system 102 or elsewhere. The storage system 102 includes a file system 208 configured and optimized to store VM data. In the example shown, metadata 210 comprises a database (or multiple databases) that is configured to store sets of metadata associated with various sets of data. For example, a set of metadata may be associated with a VM, a vdisk, or a file. Storage 212 may comprise at least one tier of storage. In some embodiments, storage 212 may comprise at least two tiers of storage, where the first tier of storage comprises flash or other solid state disk (SSD) and the second tier of storage comprises a hard disk drive (HDD) or other disk storage. In various embodiments, a set of metadata stored at metadata 210 includes at least one index that includes mappings to locations in storage 212 at which a set of data (e.g., VM, vdisk, or file) associated with the set of metadata is stored. In some embodiments, a set of metadata stored at metadata 210 includes at least an index that is a snapshot associated with a set of data stored in storage 212.

A clone may be generated based on an existing (or source) set of data stored in storage 212. In various embodiments, the clone may be generated using a snapshot of the source set of data in the source data's set of metadata that is stored in metadata 210. In various embodiments, the snapshot of the source data from which a clone is generated is referred to as a "shared snapshot." A new set of metadata is created for the clone and data associating the clone (and/or the clone's set of metadata) with the set of metadata associated with the source data is stored at metadata 210. At least some of the metadata associated with the source data is shared with the clone. As will be described in further detail below, when a received request includes an operation (e.g., read or write) to access (e.g., a current state or to a past state of) data from a set of data (e.g., a VM, a vdisk, or a file), the set of metadata associated with that data is retrieved. In the event that the data associated with the request comprises a clone, then in some instances, at least a portion of the set of metadata associated with the source data may be accessed as well.

In various embodiments, a snapshot of a set of data may be synchronized to another set of data such that subsequent to the synchronization process, the current state of the other set of data reflects that of the snapshot. In various embodiments, even after synchronization, the identity (e.g., the series of snapshots and any labels) that is associated with the set of data that has been synchronized to the snapshot is preserved.

Figure 3:
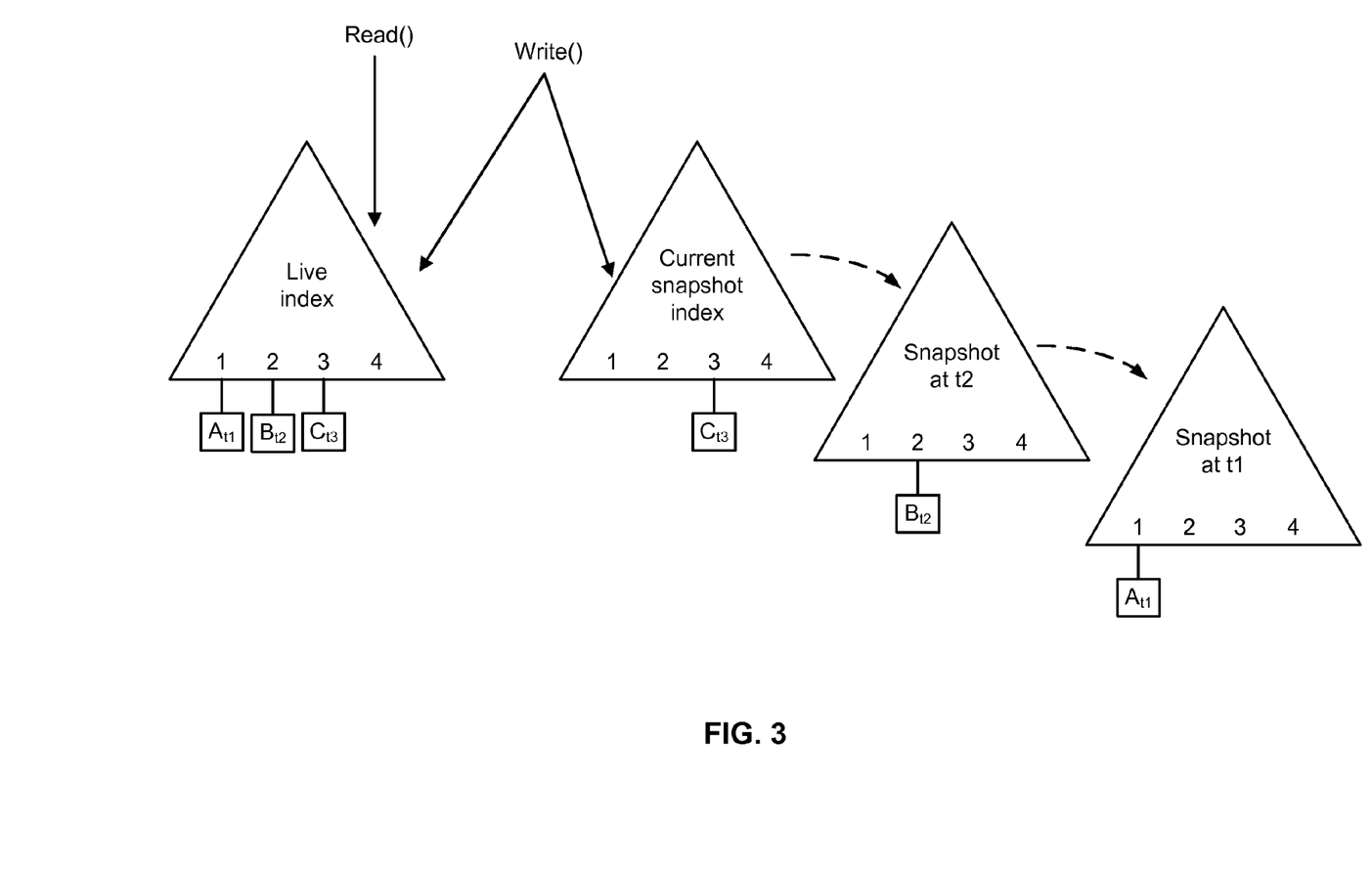
FIG. 3 is a diagram showing an example of a set of metadata associated with a set of data.

FIG. 3 is a diagram showing an example of a set of metadata associated with a set of data. In the example, the set of metadata may be associated with a file. In the example, the set of metadata includes a live index, a current snapshot index, a snapshot at time t2, and a snapshot at time t1. In the example, data associated with the file may be stored at locations 1, 2, 3, and 4.

Metadata may be thought of as the mapping used to translate a logical location (e.g., a logical offset) to a physical location (e.g., a physical offset) for data that a user may have written. In various embodiments, the metadata may be organized as an efficient index data structure such as a hash table or a B-tree. For example, the relationship between a logical offset of a data, the index, and the physical offset of the data may be described as follows: logical-offset→INDEX→physical-offset.

In various embodiments, each set of metadata includes two active indices: the "live index" and "current snapshot index." The live index and the current snapshot index are active in the sense that they can be modified. In some embodiments, the live index stores all offsets that are currently mapped in the file, while the current snapshot index stores all offsets in the file that have been mapped since the previous snapshot was created. Put another way, the live index acts as a cache of all the mappings for the current state of the file. A snapshot is typically a read-only file, but the current snapshot index is modifiable until the next prescribed snapshot creation event occurs. For example, a prescribed snapshot creation event may be configured by a user and may comprise the elapse of an interval of time, the detection of a particular event, or a receipt of a user selection to create a new snapshot. Once the next prescribed snapshot creation event is reached, the state of the current snapshot index is preserved to create a new snapshot and a new empty current snapshot index is created. In some embodiments, write operations to the set of data result in the update of both the live and current indices. In some embodiments, read operations of the current state of the set of data result in the search of only the live index. Read operations of a past state of the set of data result in a search through the series of snapshots. In various embodiments, each index is searched in a prescribed manner.

In some embodiments, a snapshot of a file is the point-in-time state of the file at the time the snapshot was created. A snapshot of a VM is the collection of file-level snapshots of files that comprise the VM. In some embodiments, a snapshot is represented as an index that stores mappings to the data that was modified after the previous snapshot was created. In other words, in some embodiments, each snapshot only includes the updates to a file (i.e., deltas) for a given time period (since the creation of the previous snapshot). As a result, the snapshot may be represented by a compact space-efficient structure.

As mentioned above, when a snapshot is created, the current snapshot index becomes the index of the snapshot, and a new empty current snapshot index is created in preparation for the next snapshot. Each snapshot is linked to the next younger and next older snapshot. In some embodiments, the links that go backward in time (i.e., the links to the next older snapshots) are traversed during snapshot and clone read operations.

Returning to the example of FIG. 3, the current snapshot index is linked (e.g., points to) the snapshot at time t2 and the snapshot at time t2 is linked to the snapshot at time t1. Read operations to the current state of the file are serviced from the live index, while write operations to the file update both the live and current snapshot indices. In the example of FIG. 3, data A is written at time t1 at location 1 and then the snapshot at time t1 is created. The data B is written at time t2 at location 2 and then the snapshot at time t2 is created. The data C is written at time t3 at location 3 and tracked in the current snapshot index. The live index tracks the current state of the data of the file at each of the locations 1, 2, 3, and 4 and may be updated each time that data is written to a location associated with the file. As such, the live index includes data A at location 1, data B at location 2, data C at location 3, and no data at location 4 because data has not been written to the file at location 4. For example, if a new data D (not shown) is to overwrite the data currently at location 3, data C, at time t4, then location 3 of the current snapshot index would be updated to map to data D and location 3 of the live index would also be updated to map to data D.

In various embodiments, a read operation on a specified snapshot for a logical block offset may proceed in the following manner: First, a lookup of the specified snapshot index is performed for the logical block offset of the read operation. If a mapping exists, then data is read from the physical device at the corresponding physical address and returned. Otherwise, if the mapping does not exist within the specified snapshot index, the link to the next older snapshot is traversed and a search of this older snapshot's index is performed. This process continues until a mapping for the logical block offset is found in a snapshot index or the last snapshot in the chain has been examined.

The use of the live index greatly enhances the efficiency of reading the current state of the file. To illustrate this, first assume that the live index of FIG. 3 is not used. In a first example of performing a read operation without using the live index of FIG. 3, we attempt to perform a read operation to access the current data associated with location 1. First, a lookup of a mapping to the data associated with location 1 is performed in the current snapshot index. However, such a mapping is not found in the current snapshot index and so the link to the next older snapshot, the snapshot at time t2, is traversed and a search for the mapping to data associated with location 1 is performed. Again, such a mapping is not found in the snapshot at time t2 and so the link to the next older snapshot, the snapshot at time t1, which is also the last snapshot in the chain, is traversed and a search for the mapping to data associated with location 1 is performed. The data associated with location 1, data A, is found in snapshot t1 and data A is accessed to complete the read operation. As described in this example, without using the live index, the data associated with location 1 was found after the expensive traversals from the current snapshot index, to the snapshot at time t2, and then to the snapshot at time t1. However, if the live index of FIG. 3 is used, then a search for the data associated with location 1 may be first performed in the live index. Using the live index, data A associated with location 1 is quickly located without needing to perform any traversals between indices.

In a second example of performing a read operation without using the live index of FIG. 3, we attempt to perform a read operation to access the current data associated with location 4. First, a lookup of a mapping to the data associated with location 4 is performed in the current snapshot index. However, such a mapping is not found in the current snapshot index and so the link to the next older snapshot, the snapshot at time t2, is traversed and a search for the mapping to data associated with location 4 is performed. Again, such a mapping is not found in the snapshot at time t2 and so the link to the next older snapshot, the snapshot at time t1, which is also the last snapshot in the chain, is traversed and a search for the mapping to data associated with location 4 is performed. Yet again, such a mapping is not found in the snapshot at time t1 and so a message that indicates that no data is stored for location 4 is returned for the read operation. As described in this example, without using the live index, the data associated with location 4 was not located even after the expensive traversals from the current snapshot index all the way to the last snapshot in the chain, the snapshot at time t1. However, if the live index of FIG. 3 is used, then a search for the data associated with location 4 may be first performed in the live index. Using the live index, it is quickly apparent that no data has been stored for location 4 and therefore an appropriate message can be returned for the read operation without needing to perform any costly traversals between indices. An example in which a read operation may attempt to read data from a location for which no data has been stored is in a distributed system in which a first node may attempt to read data at a location associated with a second node and unbeknownst to the first node, the second node never stored any data at that location.

Figure 4:
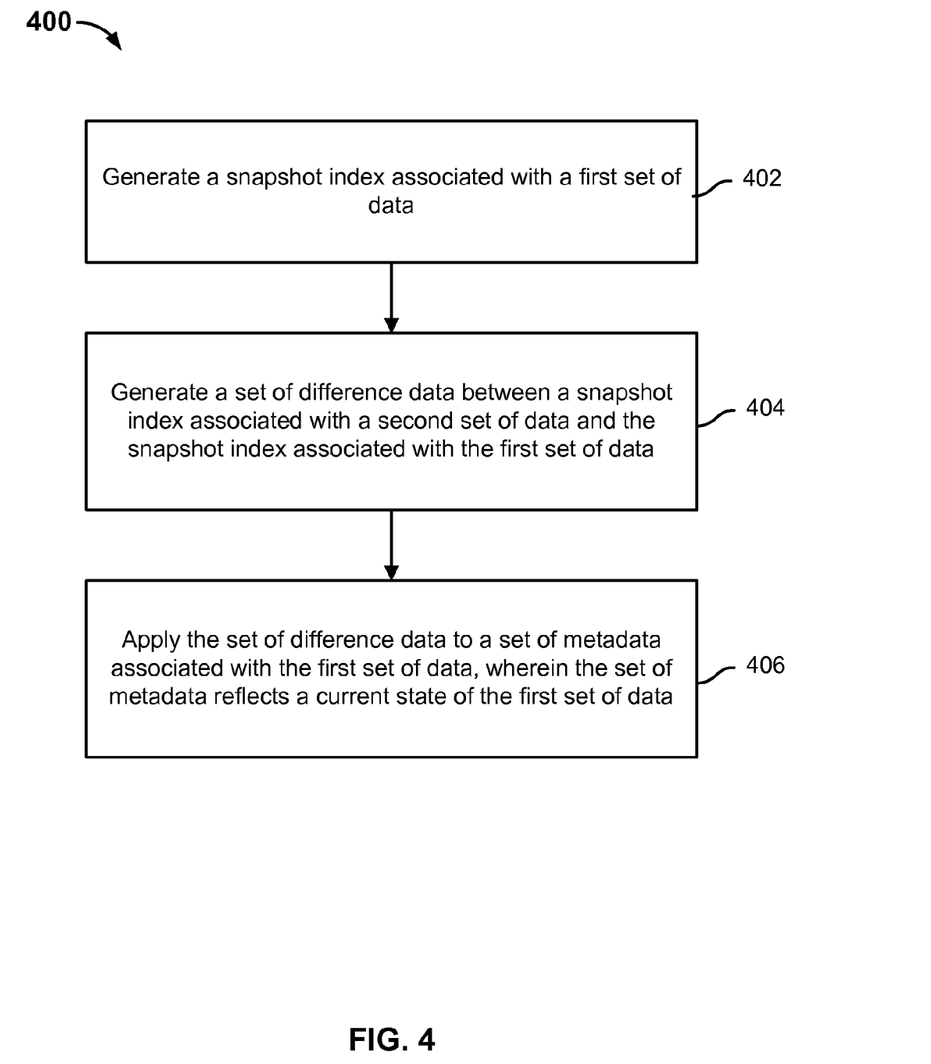
FIG. 4 is a flow diagram showing an embodiment of a process for synchronizing a first set of data with a snapshot associated with a second set of data.

FIG. 4 is a flow diagram showing an embodiment of a process for synchronizing a first set of data with a snapshot associated with a second set of data. In some embodiments, the process 400 is performed wholly or partly by a storage system and/or other processing system, for example, one configured to execute computer instructions that implement the steps of process 400.

Process 400 shows an example of synchronizing a first set of data (e.g., associated with a first VM) to a selected snapshot of a second set of data (e.g., associated with a second VM).

At 402, a snapshot index associated with a first set of data is generated. A new snapshot index is created for the first set of data. In some embodiments, the new snapshot index may capture only updates to the first set of data since the creation of the previous snapshot index (the previous snapshot is also sometimes referred to as the next older snapshot), if one exists, that is associated with the first set of data. In some embodiments, the new snapshot index is linked to the next older snapshot index. For example, the new snapshot index may be generated by preserving a current snapshot index associated with the first set of data. Once the new snapshot index is created, a new empty current snapshot index is created. In some embodiments, the new current snapshot index is linked (e.g., points) to the newly created snapshot index.

At 404, a set of difference data between a snapshot index associated with a second set of data and the snapshot index associated with the first set of data is generated. A set of difference data between the snapshot index associated with the second set of data to which the first set of data is to be synchronized and the snapshot index newly generated for the first set of data is determined. For example, a difference operation may be applied to the snapshot associated with the second set of data and the snapshot index newly generated for the first set of data. The set of difference data includes changes that once applied to the state of data at the newly generated snapshot for the first set of data, the modified snapshot index associated with the first set of data will look like the state seen at the selected snapshot index associated with the second set of data. In some cases, the set of difference data may need to "unmap" or hide entries that exist in the first set of data but do not exist in the snapshot index associated with the second set of data. In some embodiments, the set of difference data comprises a snapshot index. In some embodiments, the new current snapshot index is linked to the snapshot index that comprises the set of difference data (instead of the snapshot created at 402 for the first set of data). In some embodiments, the snapshot index that comprises the set of difference data is linked to the snapshot generated for the first set of data (at 402) and that snapshot is linked back to any snapshot indices associated with the first set of data that existed prior to performing synchronization.

At 406, the set of difference data is applied to a set of metadata associated with the first set of data, wherein the set of metadata reflects a current state of the first set of data. In some embodiments, the set of metadata associated with the first set of data comprises a live index. The set of difference data is applied to the live index of the first set of data such that after the application, the live index of the first set of data now looks like the state of data associated with the selected snapshot index of the second set of data. While the current state of the first set of data has been modified to be synchronized with the state associated with the selected snapshot of the second set of data, the identity of the first set of data is preserved. In various embodiments, preserving the identity of the set of data refers to preserving any labels, names, or metadata that identifies or is "properly" associated with the set of data, including any snapshot indices that had been generated for the set of data prior to the synchronization operation. As opposed to some conventional synchronization processes, in which this information and/or snapshot indices of a set of data may be lost when the set of data is synchronized to a selected snapshot index. Embodiments of synchronization as described herein preserve such snapshot indices. As such, even though the current state of the first set of data is synchronized to the state associated with a selected snapshot index, the existing snapshot indice(s) of the first set of data are retained and are available to be searched or used for synchronization and other operations that use snapshot indices, if desired. Furthermore, after the synchronization operation, the first set of data may still be identified as the first set of data using the same labels/names that it had prior to the synchronization process.

Figure 5:
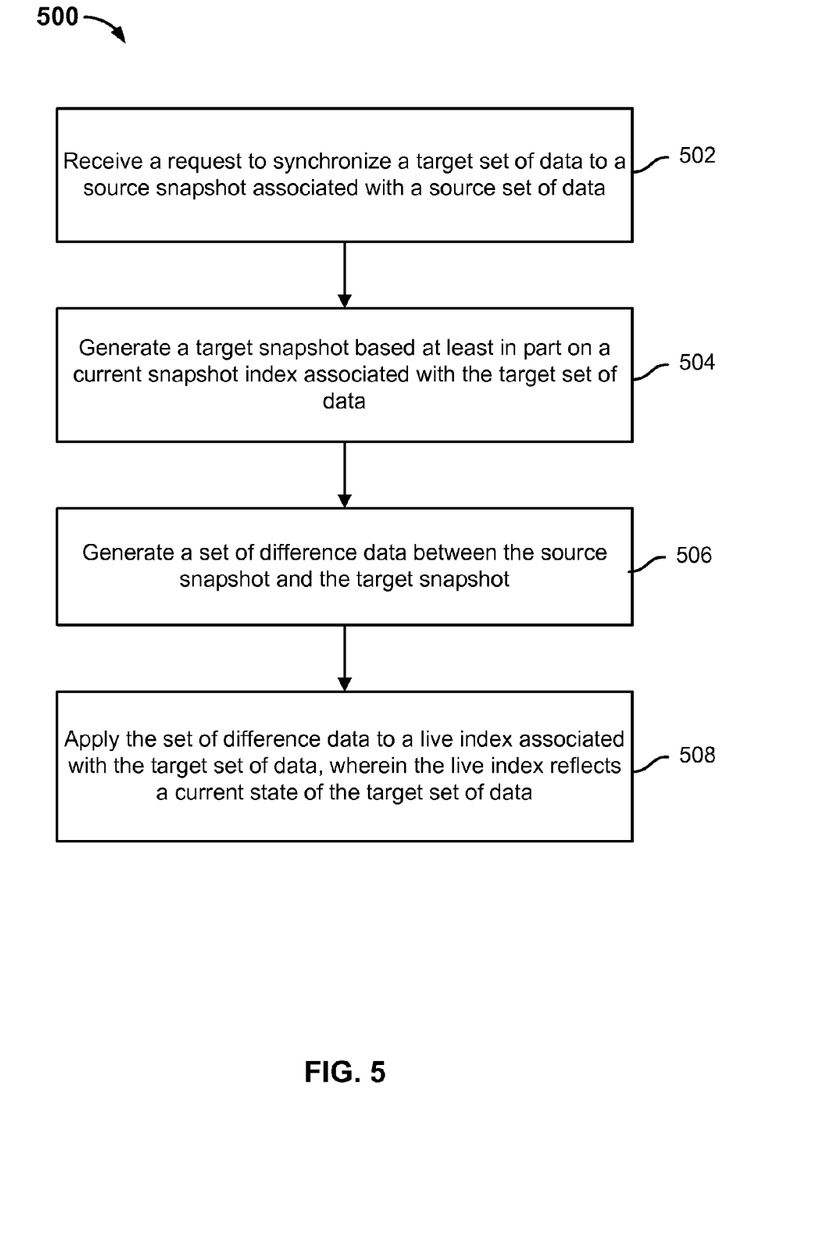
FIG. 5 is a flow diagram showing an example of a process for synchronizing a first set of data to a snapshot associated with a second set of data.

FIG. 5 is a flow diagram showing an example of a process for synchronizing a first set of data to a snapshot associated with a second set of data. In some embodiments, the process 500 is performed wholly or partly by a storage system and/or other processing system, for example, one configured to execute computer instructions that implement the steps of process 500. In some embodiments, process 400 of FIG. 4 is implemented using process 500.

At 502, a request to synchronize a target set of data to a source snapshot associated with a source set of data is received. For example, the source snapshot may comprise an existing snapshot index that was selected by a user or the source snapshot may be dynamically generated from a current snapshot index associated with the source set of data in response to a user selection to synchronize the target set of data to the current snapshot index associated with the source set of data.

At 504, a target snapshot is generated based at least in part on a current snapshot index associated with the target set of data. A target snapshot index is generated from the current snapshot index. A new empty current snapshot index is created for the target set of data and the new current snapshot index is linked to the newly created target snapshot and the newly created target snapshot is linked to a previous snapshot associated with the target set of data.

At 506, a set of difference data between the source snapshot and the target snapshot is generated. The difference (or delta) between the source snapshot and the target snapshot is computed. In some embodiments, the set of difference data may comprise a snapshot index. In some embodiments, in the event that the set of difference data comprises a snapshot, then the current snapshot index of the target set of data is linked to the snapshot that includes the difference data (instead of the target snapshot created at 504) and the snapshot that includes the difference data is linked to the target snapshot created at 504. The target snapshot is still linked back to any snapshots associated with the target set of data that existed prior to performing synchronization.

At 508, the set of difference data is applied to a live index associated with the target set of data, wherein the live index reflects a current state of the target set of data. After application of the set of difference data to the live index associated with the target set of data, the current state of the target set of data (as represented by its live index) now looks the same as the state seen at the source snapshot but any snapshots of the target set of data that existed prior to the synchronization operation are preserved and are still available for access.

Figure 6:
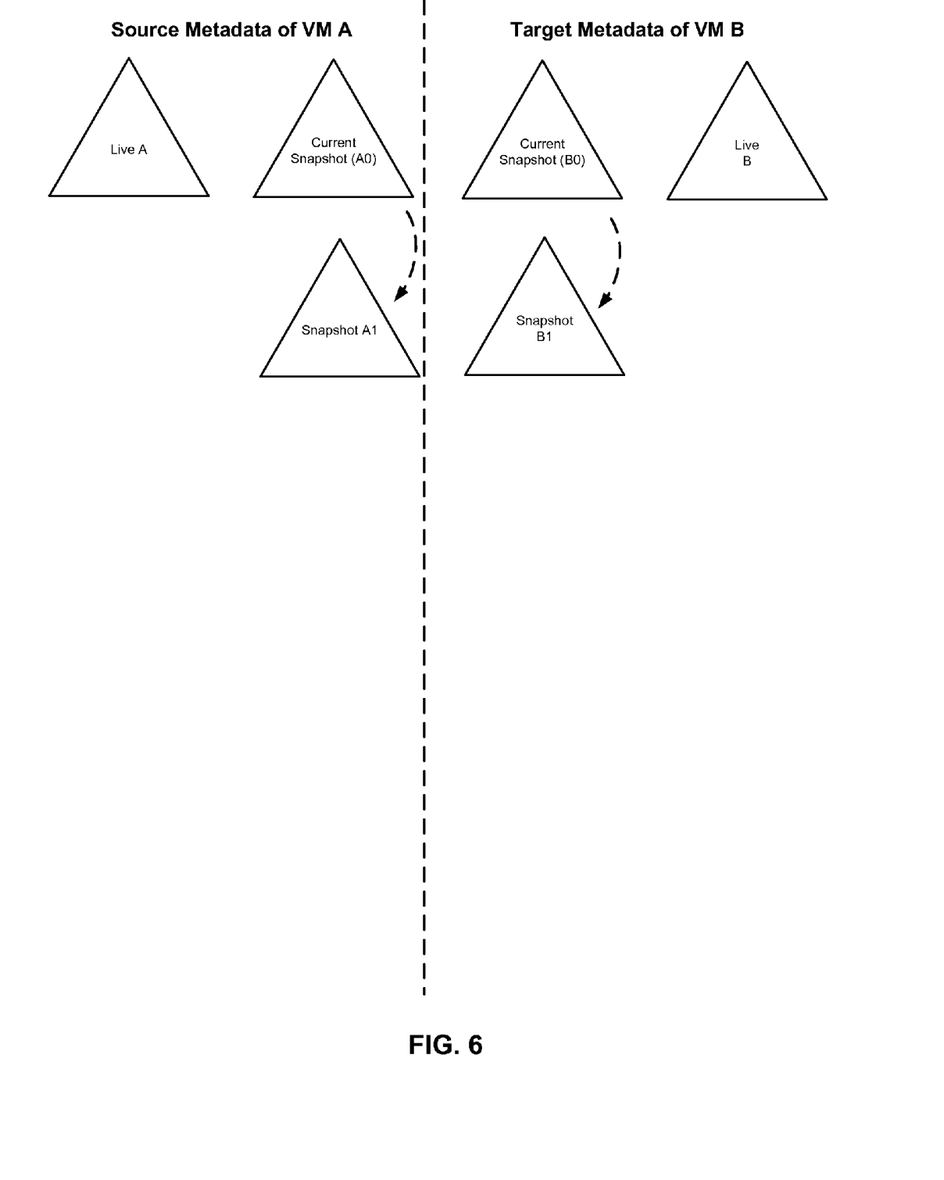
FIG. 6 is a diagram showing an example of sets of metadata associated with two VMs prior to performing synchronization.

FIG. 6 is a diagram showing an example of sets of metadata associated with two VMs prior to performing synchronization. VM A is the source data from which an associated snapshot is to be selected for synchronizing with the target data, VM B. As shown in the example, the source metadata associated with source data VM A includes live index A, current snapshot index (A0), and snapshot A1 and the target metadata associated with target data VM B includes live index B, current snapshot index (B0), and snapshot B1.

Figure 7:
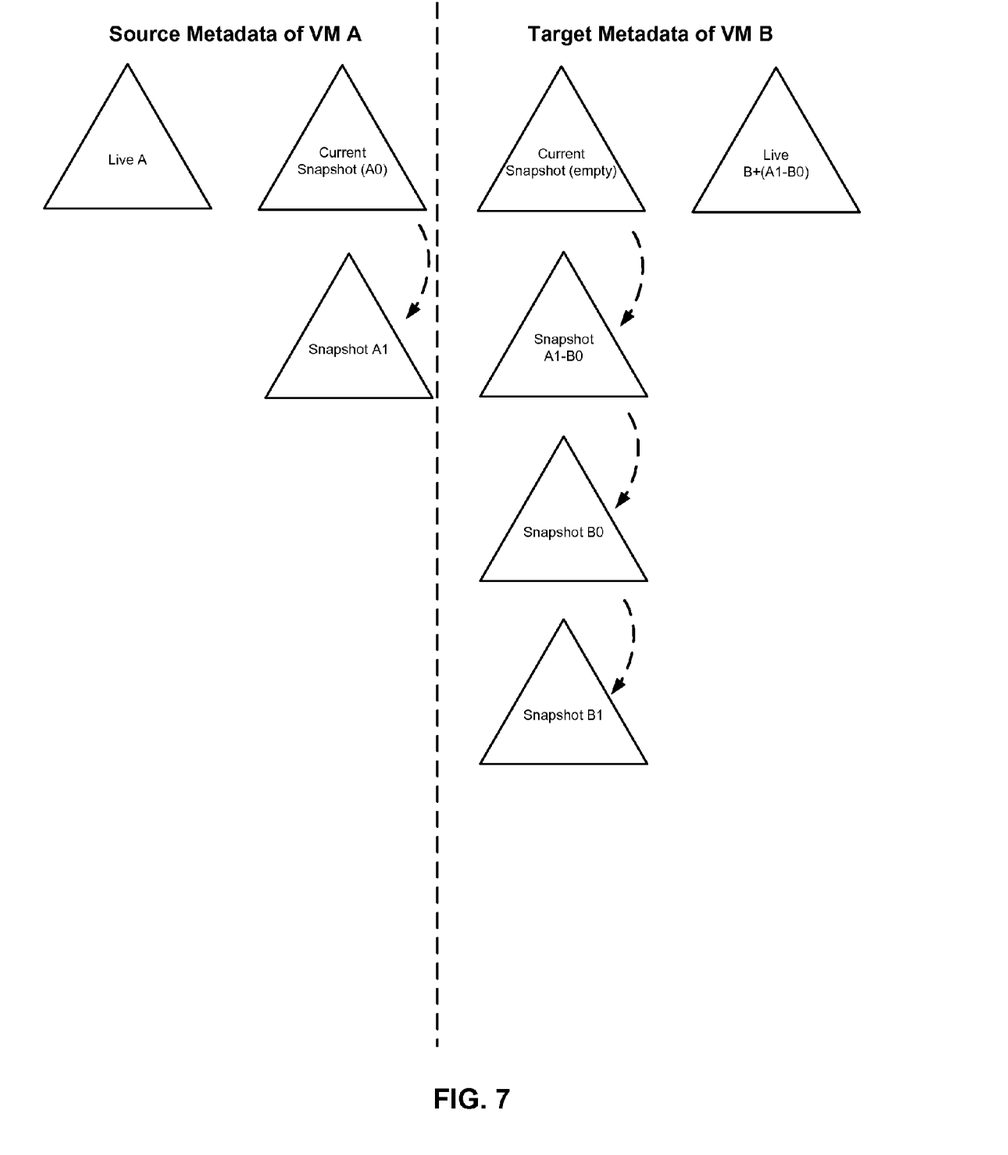
FIG. 7 is a diagram showing an example of sets of metadata associated with two VMs after performing synchronization of VM B to snapshot A1.

FIG. 7 is a diagram showing an example of sets of metadata associated with two VMs after performing synchronization of VM B to snapshot A1. The example shown in FIG. 7 includes the sets of metadata associated with VM A and VM B of FIG. 6 after synchronization of VM B to source snapshot A1 has been performed. To arrive at the sets of metadata as shown in FIG. 7 from those shown in FIG. 6, the following is performed: a snapshot of current state B0 (snapshot B0) is created based on the current snapshot index associated with target VM B. A new empty current snapshot index is generated for target VM B. Delta A1-B0, which is a snapshot index that includes changes that need to be applied to the state seen at snapshot B0 to make snapshot B0 look like the state seen at snapshot A1, is computed, and the mapping of A1-B0 is added before snapshot B0 in the chain of snapshots associated with target VM B. Therefore, the new empty current snapshot index of target VM B is linked to the delta A1-B0, and the delta A1-B0 is linked to snapshot B0, and snapshot at B0 is linked to snapshot B1. Then, the delta A1-B0 is applied to live index B so that any reads from live index B+(A1-B0) now look like the state seen from snapshot A1. The state of VM B now looks the same as the state seen at snapshot A1 but its previous snapshot B1 is preserved and still available. Furthermore, the current state of target VM B may be reverted back to its state prior to the synchronization, the state associated with snapshot B0, so long as snapshot B0 of target VM B is not deleted.

Figure 8:
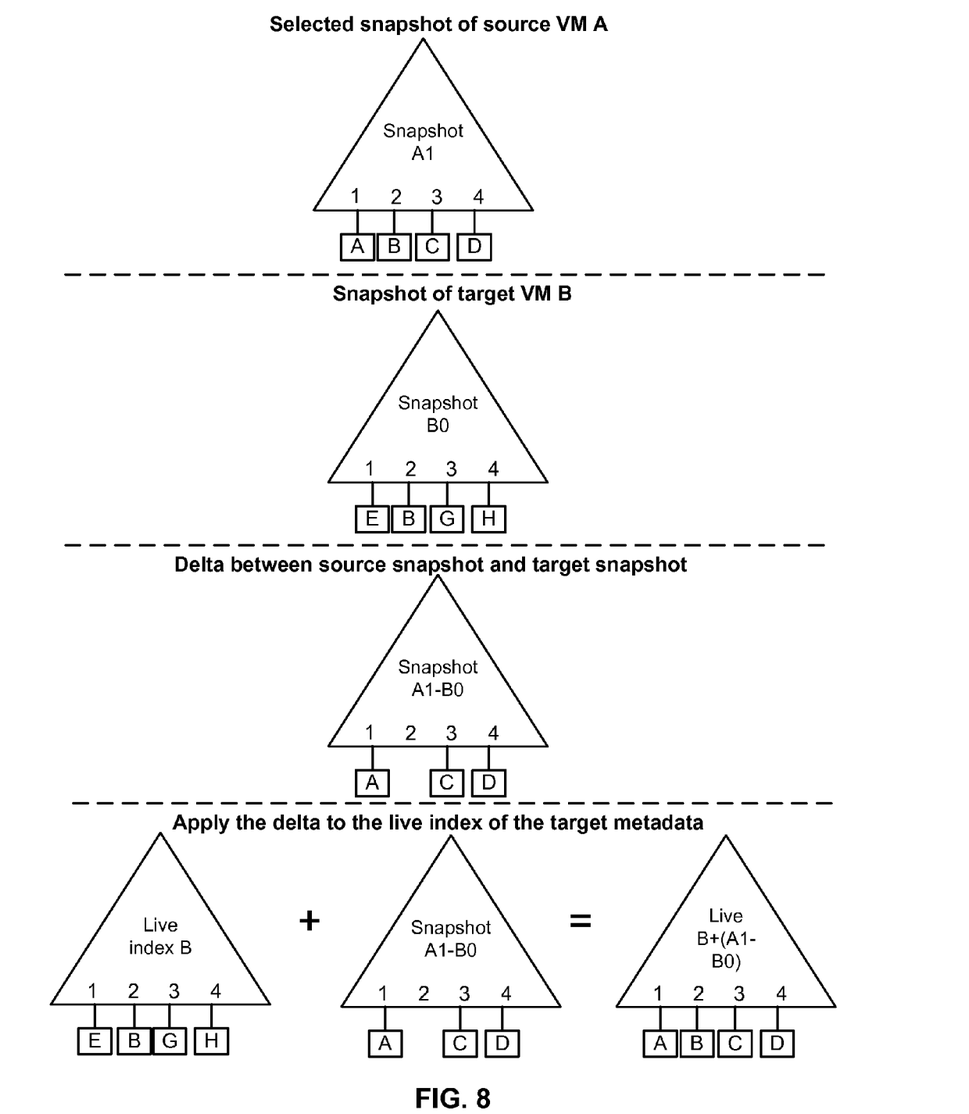
FIG. 8 includes diagrams showing examples of snapshots involved in an embodiment of a synchronization process described herein.

FIG. 8 includes diagrams showing examples of snapshots involved in an embodiment of a synchronization process described herein. In this example, assume that snapshot A1 of a source metadata associated with source VM A has been selected for synchronization to target VM B. Source snapshot, snapshot A1, includes data A, B, C, and D at the respective locations of 1, 2, 3, and 4. Snapshot B0 is generated from the current snapshot index of target VM B. Target snapshot, snapshot B0, includes data E, B, G, and H at the respective locations of 1, 2, 3, and 4. The delta between the source snapshot (snapshot A1) and the target snapshot (snapshot B0) includes data A at location 1, no data at location 2, data C at location 3, and data D at location 4. Finally, the delta A1-B0 is applied to the live index B of target VM B (which also includes data E, B, G, and H at the respective locations of 1, 2, 3, and 4) and the result, the live index B+(A1-B0), which is the current state of the target VM B, now looks like the source snapshot, the snapshot A1, with data A, B, C, and D at the respective locations of 1, 2, 3, and 4.

In some embodiments, synchronization is implemented by differencing or computing the delta between two snapshot indices and synthesizing a new snapshot index that is applied as a delta to existing snapshots and the target live index. Synchronization is particularly fast and effective when updating a VM to that of another similar VM, since the deltas that are generated in such cases will be small.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage system, comprising:
a processor configured to:
generate a target snapshot index associated with a first set of data, wherein the target snapshot index is generated based at least in part on a first active index associated with the first set of data, wherein the first active index stores one or more data values that are written to the first set of data since a creation of a previous snapshot index associated with the first set of data;
generate a set of difference data between a selected source snapshot index associated with a second set of data and the target snapshot index associated with the first set of data; and
apply the set of difference data to a second active index associated with the first set of data that reflects a current state of the first set of data to generate a synchronized active index associated with the first set of data, wherein the synchronized active index associated with the first set of data reflects a state of the second set of data associated with the selected source snapshot index; and
a memory coupled to the processor and configured to store the target snapshot index.

2. The storage system of claim 1, wherein the processor is configured to receive a request to synchronize the first set of data to the selected source snapshot index associated with the second set of data.

3. The storage system of claim 1, wherein the first active index comprises a current snapshot index associated with the first set of data.

4. The storage system of claim 1, wherein the selected source snapshot index associated with the second set of data is older than the target snapshot index associated with the first set of data and the first set of data and the second set of data comprise the same set of data.

5. The storage system of claim 1, wherein the second active index associated with the first set of data that reflects the current state of the first set of data comprises a live index associated with the first set of data.

6. The storage system of claim 1, wherein the processor is further configured to associate the target snapshot index associated with the first set of data with another previously generated snapshot index associated with the first set of data.

7. The storage system of claim 1, wherein the set of difference data comprises a difference snapshot index.

8. The storage system of claim 1, wherein the first set of data is associated with a virtual machine.

9. The storage system of claim 1, wherein the second set of data is associated with a virtual machine.

10. The storage system of claim 1, wherein an existing snapshot index associated with the first set of data is not deleted or modified by synchronization.

11. A method, comprising:
generating, by a processor, a target snapshot index associated with a first set of data, wherein the target snapshot index is generated based at least in part on a first active index associated with the first set of data, wherein the first active index stores one or more data values that are written to the first set of data since a creation of a previous snapshot index associated with the first set of data;
generating a set of difference data between a selected source snapshot index associated with a second set of data and the target snapshot index associated with the first set of data; and
applying the set of difference data to a second active index associated with the first set of data that reflects a current state of the first set of data to generate a synchronized active index associated with the first set of data, wherein the synchronized active index associated with the first set of data reflects a state of the second set of data associated with the selected source snapshot index.

12. The method of claim 11, wherein the first active index comprises a current snapshot index associated with the first set of data.

13. The method of claim 11, wherein the selected source snapshot index associated with the second set of data is older than the target snapshot index associated with the first set of data and the first set of data and the second set of data comprise the same set of data.

14. The method of claim 11, wherein the second active index associated with the first set of data that reflects the current state of the first set of data comprises a live index associated with the first set of data.

15. The method of claim 11, further comprising associating the target snapshot index associated with the first set of data with another previously generated snapshot index associated with the first set of data.

16. The method of claim 11, wherein the set of difference data comprises a difference snapshot index.

17. The method of claim 11, wherein the first set of data is associated with a virtual machine.

18. The method of claim 11, wherein the second set of data is associated with a virtual machine.

19. The method of claim 11, wherein an existing snapshot index associated with the first set of data is not deleted or modified by synchronization.

20. A computer program product, the computer program product being embodied in a non-transitory computer readable storage medium and comprising computer instructions for:
generating a target snapshot index associated with a first set of data, wherein the target snapshot index is generated based at least in part on a first active index associated with the first set of data, wherein the first active index stores one or more data values that are written to the first set of data since a creation of a previous snapshot index associated with the first set of data;
generating a set of difference data between a selected source snapshot index associated with a second set of data and the target snapshot index associated with the first set of data; and
applying the set of difference data to a second active index associated with the first set of data that reflects a current state of the first set of data to generate a synchronized active index associated with the first set of data, wherein the synchronized active index associated with the first set of data reflects a state of the second set of data associated with the selected source snapshot index.

\* \* \* \* \*